United States Patent Office 3,297,676
Patented Jan. 10, 1967

3,297,676
RECOVERY OF LIGNOSULFONATES
Friedrich E. Brauns, Bellingham, Wash., assignor to Georgia-Pacific Corporation, Portland, Oreg., a corporation of Georgia
No Drawing. Filed Aug. 14, 1963, Ser. No. 301,994
14 Claims. (Cl. 260—124)

This invention relates to a process for the recovery of a lignosulfonate from a lignosulfonate-containing solution.

There are a number of processes where a product is obtained which contains lignosulfonates from which it is desirable to recover these constituents. For example, in the sulfite paper pulp process, a product is obtained from the treatment of lignocellulose compositions which contain from about 10% to 14% of dissolved materials. As high as 65% of the dissolved constituents may be lignosulfonic acids or their salts, about 25% of the solids may be hemicellulose sugar derivatives, and about 10% inorganic material. The lignosulfonates found in the solution are polymeric materials comprised of phenylpropane type structural units linked in various ways, the exact configuration of which is unknown. Some of the side chains contain the sulfonate groups. The lignosulfonate polymer may be classified as macro-molecular, having an average molecular weight of about 10,000. It is desirable to recover these compounds in increments having different molecular weights. Products having different molecular weights have different utility due to the variation in their chemical and physical characteristics. Also, it may be desirable to remove the lignosulfonates in the recovery of other constituents which may be found in these solutions.

It is, therefore, an object of this invention to provide a process for the recovery of lignosulfonates from lignosulfonate-containing solutions. A further object is to provide a process for the separation and recovery of lignosulfonates from spent sulfite liquors. A still further object is to provide a process for the separation of lignosulfonates from lignosulfonate-containing solutions in fractions of different molecular weights.

The above and other objects are obtained according to the invention by contacting the lignosulfonate-containing solutions with chitin at a pH not greater than 6. In contacting the lignosulfonate solution with chitin, the lignosulfonates are combined or adsorbed by the chitin and can be removed from the impregnated chitin by washing with an alkaline solution. The lignosulfonates are selectively adsorbed as to the molecular weight of the lignosulfonates. Thus, it is possible to recover and separate the lignosulfonates in increments of different molecular weights.

The term "lignosulfonate" as used herein means the sulfonated lignin in acid, salt, or complex forms as lignosulfonic acids and the salts and complexes of these acids.

The above process is effective for the separation and recovery of lignosulfonates from any lignosulfonate-containing solution. It is especially effective for separation and recovery of the lignosulfonate from products obtained by or from delignification of lignocellulosic materials such as wood, straw, corn stalks, bagasse, and the like. In delignification of lignocellulosic materials by certain processes, such as the sulfite or bisulfite process, the lignin is sulfonated and found in the spent liquor commonly referred to as "spent sulfite liquor." In some delignification processes, such as the alkaline or neutral pulping processes, the lignin product obtained in the process may contain the lignin not in a sulfonated form. These products, however, may be easily converted to a lignosulfonate solution by the various known methods of sulfonation. In addition to the recovery of lignosulfonates from products obtained from delignification of lignocellulosic materials, the lignosulfonates may be recovered from lignosulfonate-containing solutions obtained by the sulfonation of other lignin-containing material, such as peat, lignite, and the like.

The lignosulfonate reaction products obtained from delignification or sulfonation may be processed according to this invention without prior treatment or the products may be treated to remove certain constituents such as the fermentable sugars, or otherwise treated prior to the recovery of the lignosulfonates. The product obtained upon sulfonation of lignin-containing material may have the lignosulfonates present as salts or complexes of metals such as calcium, magnesium, ammonium, sodium and the like, depending upon the process used in the sulfonation. The lignosulfonate present in these products may easily be converted to lignosulfonic acid by acidification or by deashing using ion exchange resins.

Chitin is a polysaccharide consisting of a long unbranched molecule of N-acetyl-D-glucosamine linked by beta-1,4 bonds. It is found as an important skeletal substance of insects and in the shells of the insects and mollusks. Crab and lobster shells are usually one of the main sources of chitin. In the shells and skeletons, the chitin is associated with calcium carbonate and protein which are removed. For the removal of calcium carbonate, the shells are generally treated with a dilute hydrochloric acid, while the removal of protein is accomplished by treating the shells with sodium or potassium hydroxide. After the removal of the calcium carbonate and protein, the chitin may be used as is or further treated to bleach it.

The various known methods for contacting a solid with a liquid may be used for contacting of the lignosulfonate-containing solution with chitin. The chitin may be ground and intermixed with the solution and then filtered to separate the chitin from the solution. It is more convenient, however, to place the chitin in a bed and pass the lignosulfonate solution through the bed. When a lignosulfonate salt is to be passed through the bed, the bed is activated by treating it with an acid solution such as, for example, a mineral acid as hydrochloric, sulfuric, sulfurous, and the like, or an aliphatic or an aromatic organic acid as, for example, formic, propionic, and benzoic acids. This may also be accomplished by passage of an acidic gas such as sulfur dioxide or carbon dioxide through the bed. With acidic solutions of lignosulfonates such as obtained by acid treatment or by ion exchange, it is not necessary to acidify the chitin prior to use.

In contacting the lignosulfonate with chitin, it is essential that the solution be at a pH not greater than 6, preferably at a pH in a range of 1 to 4. At a pH of 6 or lower, the lignosulfonates are selectively adsorbed. At times, it may be preferable to acidify the lignosulfonate-containing product with a sufficient amount of a mineral acid such as hydrochloric or sulfuric acid to convert the lignosulfonate salt in the product to lignosulfonic acid prior to contacting the chitin.

The chitin selectively adsorbs or in some other manner combines with the lignosulfonates in the solution as the solution is passed through the bed. It has a greater affinity for the high molecular weight lignosulfonates and will thus preferentially retain the large lignosulfonates. When a small amount of lignosulfonate solution is passed slowly through the chitin, most of the lignosulfonate may be picked up or adsorbed by the chitin. However, by using a larger amount of the lignosulfonate solution, the higher molecular weight lignosulfonates are retained and the lower molecular weight lignosulfonates pass through.

As a result of this property, it is possible to obtain a fractionation or separation of the lignosulfonates according to their molecular weights. By adding a given amount of a lignosulfonate solution to the bed at a particular rate, it is possible for the chitin to adsorb substantially all of the lignosulfonates from the solution. Upon elution with an alkaline solution, the lower molecular weight lignosulfonates are eluted first, so that by the passage of an alkaline solution and separating the effluents in increments, it is possible to obtain the lignosulfonates in fractions of different molecular weights.

It is not necessary to obtain the separation or fractionation of the lignosulfonates on elution. By controlling the amount of the solution passed through the bed and the rate of passage, it is possible to control within a narrow range the molecular weight of the lignosulfonates being picked up in the bed. Upon elution, all of the product obtained contains lignosulfonates within a narrow range of molecular weights. Thus, a predetermined amount of lignosulfonate solution may be passed through a bed of chitin until a certain fraction of the lignosulfonates having a particular range of molecular weights is adsorbed. If desired, the lignosulfonate solution may be recycled a number of times into contact with the chitin. The chitin is eluted between each contact so that by each recycle an increment is adsorbed by the chitin having a different molecular weight range. By this process, it is possible to progressively remove increments of lignosulfonates of different molecular weights from the solution. As many fractions as desired may thus be obtained. However, usually lignosulfonates, for example, from spent sulfite liquor are separated in two or three fractions.

In eluting or washing the chitin to recover the sorbed lignosulfonates, an alkaline solution is used. Aqueous solutions of ammonium hydroxide and the alkali metal hydroxides are preferred, although other alkaline reagents can be used, for example, alkaline earth metal oxides or hydroxides and alkali metal oxides. Generally, a solution having a pH in the range of 9 to 12 is preferred, although a solution of a pH of at least 7 and up to 14 is operative. In addition to using an alkaline solution, it may be desirable to use a solution of lignosulfonates having a molecular weight in the same range as that which is sorbed on the chitin. Thus, a solution of lignosulfonates having approximately the same molecular weight as that sorbed by the chitin is passed through the bed and the concentration of the solution is thus increased by the elution of the lignosulfonates from the bed. It is essential, however, that the lignosulfonate solution being passed through the bed be alkaline or preferably have a pH in the range of 9 to 12 achieved by the addition of ammonia or alkali metal hydroxide or alkaline earth metal oxide or hydroxide to the lignosulfonate solution. By this method, it is possible to obtain the particular fractions of lignosulfonates in a solution free of other constituents at a concentration approaching the concentration of the total lignosulfonate in the untreated solution. In addition, the lignosulfonate in the alkaline solution acts as a buffer permitting thereof strong alkaline reagents and also alkaline reagents which may have limited solubility in water such as calcium hydroxide or magnesium hydroxide.

The concentration of the lignosulfonate solution used in contacting the chitin may be widely varied. The lignosulfonates are combined or picked up by the chitin from solutions containing less than 0.001 weight percent and thus may be used for concentration purposes. Highly concentrated solutions may be used as long as the viscosity of the solution is low enough to permit the solution to pass through the chitin or to permit the chitin to be intermixed and separated from the solution. Since an increase in temperature will decrease the viscosity, higher concentrations may be satisfactorily handled when elevated temperatures are employed in the process. The concentrations of the solutions generally used are in the range of 10 to 40 weight percent which will give a solution having a satisfactory viscosity.

The process can be operated over a wide range of flow rates and ratios of lignosulfonate to chitin. The rate and the ratio used will vary with the particular separation and method of operation being used as well as the particle size of the chitin. If a large amount of chitin is used for a given small volume of lignosulfonate solution, higher percentages of the lignosulfonate are sorbed. Upon the addition of more lignosulfonate solution, the higher molecular weight lignosulfonates replace the lower molecular weight lignosulfonates. For example, when a loading of approximately 0.8 gram of spent sulfite liquor from which sugars had been removed by alcohol fermentation per one gram of chitin is used, approximately 50 to 60% of the total lignosulfonates in the solution passed through the bed is picked up by the chitin. However, when a loading of about 0.35 to 0.40 gram of the same spent sulfite liquor is used, approximately 80 to 90% of the total lignosulfonates in the solution may be sorbed. The amount of lignosulfonates sorbed by the chitin will determine the point where the separation between the different molecular weight products is made.

Although the rates and the ratios of lignosulfonate solution with respect to chitin may be widely varied, generally a sufficient amount of solution is passed through the chitin so that the chitin is contacted with a solution such that the amount of lignosulfonates present is from 0.01 to 10 times the weight of the chitin. However, this ratio or amount may vary depending upon the separation or fractionation of sulfonates desired and the concentration of the lignosulfonate solution being treated. For recovery of lignosulfonates, a ratio of lignosulfonate to chitin of 0.1 to 0.3 may be preferred while for fractionation the ratio in the range of 0.3 to 1.3 may be desirable.

The following examples further illustrate the invention.

*Example I*

A series of runs were made where the loading of the spent sulfite liquor solids on the chitin was varied and the fractionation thus obtained was determined.

The chitin used was prepared by contacting a given amount of crab shells with dilute hydrochloric acid to extract the calcium carbonate. After the extraction of the calcium carbonate, the shells were washed with water and ground to obtain a shredded-type of product comprised mostly of thin flaky material ranging in size from about 0.5 to 2 millimeters. Most of the protein present was then removed by flotation with water after which the product was treated with sulfurous acid to remove the residual calcium carbonate.

The chitin thus prepared was placed in a column having an internal diameter of 7½ centimeters. The column was filled to the height of 100 centimeters which required about 290 grams of chitin. Before using the bed for fractionation, the bed was preconditioned by alternately treating with one normal ammonium hydroxide solution. Prior to the passing of the sulfonated liquor, the bed was treated with a one percent sulfur dioxide solution and then washed with water.

Three runs were made using spent sulfite liquor from which the hexose sugars have been removed by alcoholic fermentation. The fermented spent sulfite liquor contained 115 grams of dissolved solids per liter. In one run, two liters of the fermented spent sulfite liquor were passed through the column at a rate of 24 milliliters per minute, in another run the rate was increased to 42 milliliters per minute, and in the third run, one liter of the solution was passed through at 24 milliliters per minute. After the passage of the given amount of the liquor, the sorbed lignosulfonates were eluted from the chitin by washing with one liter of one normal ammonium hydroxide and then the column washed with water and reconditioned by the passage of a dilute sulfurous acid solution. The fermented spent liquor solutions used were at a pH of 3.1.

The material remaining in the spent sulfite liquor after the solution had been passed through the bed of chitin and the material obtained upon the elution of the bed were analyzed and the diffusion coefficients for the unadsorbed lignosulfonates and of the lignosulfonate eluted were determined by use of the procedure described in "Lignin XI. Estimation of Polymolecularity in Lignin Sulfonate Polymers from Diffusion Measurements" by J. Moacanin, H. Nelson, E. Back, V. F. Felicetta, and J. L. McCarthy in the "Journal of the American Chemical Society," vol. 81, 2054 (1959). As described in the article, the diffusion coefficient is indicative of the molecular weight, decreasing in numerical value with increase in molecular weight average. The diffusion coefficient of the lignosulfonates in the feed solution was 12.1 mm.$^2$/day.

The results obtained in the fractionations are given in the table below:

| Run | Volume of Feed Solution Passed Through Bed, ml. | Total Solids in Feed, gm. | Flow Rate, ml./min. | Unadsorbed Solids | | | Sorbed Solids | | |
|---|---|---|---|---|---|---|---|---|---|
| | | | | Gms. | Percent of Total Solids | Diff. Coef. mm.$^2$/day | Gms. | Percent of Total Solids | Diff. Coef. mm.$^2$/day |
| 1 | 2,000 | 230 | 24 | 128 | 56 | 17.4 | 92 | 40 | 9.8 |
| 2 | 2,000 | 230 | 42 | 143 | 63 | 17.0 | 87 | 38 | 8.9 |
| 3 | 1,000 | 115 | 24 | 38 | 34 | 25.5 | 78 | 68 | 10.3 |

Runs similar to that described above were made where, after elution of the higher molecular weight lignosulfonates from the bed, the previously contacted spent sulfite liquor was recycled through the chitin bed. The lower molecular weight lignosulfonates which had previously been unadsorbed were thus sorbed. Also, instead of washing the pregnant chitin with ammonium hydroxide solution, a solution of lignosulfonates previously obtained from washing the chitin was recycled. The pH of the solution of lignosulfonates was adjusted to about 11 by the addition of a lime slurry. In this manner, the final solution obtained may be concentrated to substantially the same concentration as the original lignosulfonate solution.

*Example II*

The 290 grams of chitin were removed from the column of Example I and fermented spent sulfite liquor was slurried with the chitin and then the product filtered to remove the chitin. Two runs were made where two liters of the same fermented spent sulfite liquor diluted with one liter of water were intermixed for five minutes at a pH of 5 with the chitin. After elution with ammonium hydroxide solution and regeneration with sulfur dioxide, the experiment was repeated except that the pH of the slurry was maintained at 3.2 in the adsorption step by addition of sulfur dioxide. The results obtained are shown in the table below:

ment with an ammonium hydroxide solution and washed.

Fermented spent sulfite liquor obtained from the acid sulfite pulping of coniferous wood was treated with a cation exchange resin similar to the resin sold under the trademark of Dowex 50W–8x to convert the calcium lignosulfonates in the liquor to lignosulfonic acids. Different amounts of the so treated spent sulfite liquor were passed through the column at a rate of about 10 ml. per minute to obtain different loadings of the lignosulfonic acids on the chitin. After the addition of the predetermined amount of the lignosulfonic solutions, the bed was washed with 400 milliliters of water. The bed was then eluted with 20 ml. of a 2 N ammonium hydroxide solution and washed with water to recover the sorbed portion. The sorbed portions were analyzed for methoxyl as a measure of lignosulfonate content and for the diffusion coefficient as described in Example I. The results obtained and details are shown in the table below:

| Column Loading (g. SSL solids/g. chitin) | Sorbed Material (Percent of Feed) | Methoxyl, Percent | Diff. Coef. (mm.$^2$/day) |
|---|---|---|---|
| 0.000 | | 8.9 | 10.8 |
| 0.095 | 83.2 | 10.0 | 10.9 |
| 0.159 | 70.6 | 10.7 | 10.0 |
| 0.318 | 51.5 | 11.2 | 8.5 |
| 0.636 | 29.0 | 11.3 | 7.2 |
| 1.270 | 15.5 | 11.0 | 7.4 |

What is claimed is:

1. A process for the separation of a lignosulfonate from a lignosulfonate-containing solution which comprises contacting the lignosulfonate-containing solution at a pH not greater than 6 with chitin to combine the lignosulfonate with the chitin.

2. A process for the separation of a lignosulfonate from a lignosulfonate-containing solution obtained from the delignification of a lignin-containing material which comprises contacting the lignosulfonate-containing solution at a pH not greater than 6 with chitin to thereby combine the lignosulfonate with the chitin.

3. A process for the recovery of a lignosulfonate from a lignosulfonate-containing solution obtained from the delignification of a lignocellulosic material, which comprises contacting the lignosulfonate-containing solution at

| Run | Vol. of Feed Intermixed | Feed Solids, gms. | pH of Slurry | Unadsorbed Solids | | | Sorbed Solids | | |
|---|---|---|---|---|---|---|---|---|---|
| | | | | Gms. | Percent of Total Solids | Diff. Coef., mm.$^2$/day | Gms. | Percent of Total Solids | Diff. Coef., mm.$^2$/day |
| 1 | 3,000 | 230 | 5 | 146 | 63 | 15.6 | 48 | 21 | 9.7 |
| 2 | 3,000 | 230 | 3.2 | 108 | 47 | 15.4 | 88 | 39 | 10.5 |

*Example III*

Chitin was prepared in a manner similar to that described in Example I. To a 3.6 cm. I.D. column, about 21 grams of chitin were packed to obtain a column 30 cm. in height. The bed was placed in a base form by treata pH not greater than 6 with chitin to combine the lignosulfonates with chitin and recovering the lignosulfonates from the contacted chitin.

4. A process for the recovery of a lignosulfonate from a lignosulfonate-containing solution obtained from delignification of a lignocellulosic material which comprises contacting the lignosulfonate-containing solution with chitin at a pH not greater than 6 to thereby selectively combine a portion of the lignosulfonates in the solution with the chitin and washing the contacted chitin with an aqueous alkaline solution selected from the group consisting of alkali metal hydroxides and oxides, alkaline earth metal hydroxides and oxides and ammonium hydroxide to thereby elute the combined lignosulfonates from the contacted chitin.

5. A process according to claim 3 wherein the lignosulfonate-containing solution is a spent sulfite liquor.

6. A process according to claim 5 wherein the pH is in the range of 1 to 4.

7. A process according to claim 4 wherein the aqueous alkaline solution used in washing the contacted chitin is a solution containing lignosulfonates having a molecular weight in the range of the molecular weight of the lignosulfonates combined with the chitin.

8. A process for the recovery of a lignosulfonate from a lignosulfonate-containing solution obtained from delignification of a lignocellulosic material, which comprises contacting, at a pH not greater than 6, the lignosulfonate-containing solution with chitin to thereby selectively combine a portion of lignosulfonates from said solution with the chitin, contacting the previously contacted lignosulfonate-containing solution with unimpregnated chitin at a pH not greater than 6 to thereby combine additional portions of the lignosulfonates from said solution with the chitin, and washing the so contacted chitin with an aqueous alkaline solution selected from the group consisting of alkali metal hydroxides and oxides, alkaline earth metal hydroxides and oxides and ammonium hydroxide to elute the combined lignosulfonates from the chitin.

9. A process according to claim 8 wherein the alkaline solution used to wash the chitin to elute the combined ligno sulfonates is a solution containing lignosulfonates having a molecular weight in the range of the molecular weights of the lignosulfonates combined with the chitin.

10. A process according to claim 9 wherein the lignosulfonate-containing solution obtained from delignification of a lignocellulosic material is spent sulfite liquor.

11. A process for the separation of lignosulfonates from a lignosulfonate-containing solution obtained from the delignification of a lignocellulosic material, which comprises treating the lignosulfonates in the sulfonate-containing solution with an acid to thereby convert the lignosulfonates in the solution to lignosulfonic acids, contacting the resulting mixture with chitin to combine a portion of the lignosulfonic acid in the resulting mixture with the chitin, washing the contacted chitin with an aqueous alkaline solution selected from the group consisting of alkali metal hydroxides and oxides, alkaline earth metal hydroxides and oxides and ammonium hydroxide to elute the combined lignosulfonic acids, washing the eluted chitin, contacting the previously contacted resulting mixture with the washed chitin to combine an additional portion of the lignosulfonic acids with the chitin, and washing the recontacted chitin with an aqueous alkaline solution selected from the group consisting of alkali metal hydroxides and oxides, alkaline earth metal hydroxides and oxides and ammonium hydroxide to elute the combined lignosulfonic acids.

12. A process according to claim 11 wherein the lignosulfonate-containing solution is spent sulfite liquor.

13. A process according to claim 12 wherein the alkaline solution used to elute the combined lignosulfonic acid from the chitin is a solution containing lignosulfonates having a molecular weight in the range of the molecular weights of the lignosulfonic acids combined with the chitin.

14. A process for the recovery of a lignosulfonate from a lignosulfonate-containing solution obtained by the sulfonation of a lignin-containing material, which comprises contacting the lignosulfonate-containing solution at a pH not greater than 6 with chitin to thereby combine the lignosulfonates with chitin, washing the chitin with an aqueous alkaline solution selected from the group consisting of alkali metal hydroxides and oxides, alkaline earth metal hydroxides and oxides and ammonium hydroxide to thereby elute the lignosulfonates from the chitin in separate increments, and recovering the wash solution containing the lignosulfonate in the separate increments.

No references cited.

CHARLES B. PARKER, *Primary Examiner.*

D. R. PHILLIPS, *Assistant Examiner.*